May 27, 1969        U. K. BONSE ET AL        3,446,961
X-RAY INTERFEROMETER USING THREE SPACED PARALLEL CRYSTALS
Filed Feb. 1, 1966

INVENTORS
U.K. Bonse
M. Hart
BY Stowell & Stowell
ATTORNEYS

Wedge Shift →

INVENTORS
U. Bonse
M. Hart

BY Stowell & Stowell
ATTORNEYS

United States Patent Office
3,446,961
Patented May 27, 1969

3,446,961
X-RAY INTERFEROMETER USING THREE
SPACED PARALLEL CRYSTALS
Ulrich Karl Bonse, Munster, Germany, and Michael Hart, Bristol, England, assignors to Research Corporation, New York, N.Y., a nonprofit corporation of New York
Filed Feb. 1, 1966, Ser. No. 524,088
Int. Cl. G01n 23/20
U.S. Cl. 250—51.5                    5 Claims

ABSTRACT OF THE DISCLOSURE

An X-ray interferometer element formed of a single crystal. Three upstanding and parallel walls are joined to a base, the walls performing the functions of a beam splitter, transmission mirrors, and analyzer.

---

This invention relates to an X-ray interferometer and has for its primary object the provision of such a device in which the principal parts of the paths of interfering beams are widely separated and in air.

An X-ray interferometer made in accordance with the invention has a wide variety of applications wherever the measurement of phase shifts between X-rays is important. Among the possible applications are (1) the exact measurement of the refractive index for X-rays (an accuracy of 0.1% can easily be achieved for light elements), (2) exact measurements of the thicknesses of small and complicated objects, (3) X-ray phase contrast micrography, particularly of biological materials (with copper K$\alpha$ radiation, layers of carbon, nitrogen and oxygen only a few microns in thickness can easily be distinguished), (4) the measurement of extremely small lattice distortions, and (5) the direct measurement of dispersion surfaces.

In accordance with the invention, a large and highly perfect single crystal block is formed by cutting two wide grooves in the block so that different parts of the same crystal function as a beam splitter, as transmission mirrors for the split beam, and as an analyser crystal. In this way the very important spatial lattice coherence or identity of lattice form and spacing between all three crystals is maintained over long periods of time. In principle, three similar crystals could be used, but in practice many difficulties are avoided by defining the three crystals by a single perfect crystal as described below. The practical problems encountered, for example, mounting three distinct crystals in the desired relative positions and maintaining the positions are extremely difficult to overcome.

The specific nature of the invention, as well as the advantages thereof, will clearly appear from a description of a preferred embodiment as shown in the accompanying drawings in which.

Figure 1:
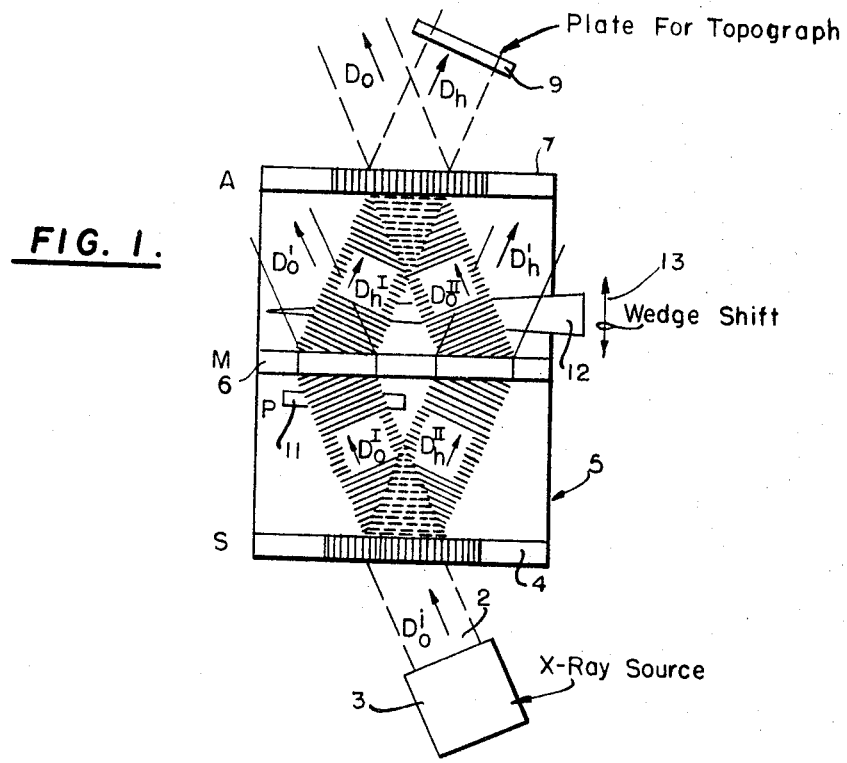
FIGURE 1 is a partially schematic plan view of an apparatus illustrating the invention.

Referring to FIG. 1, a collimated beam of X-rays 2 is directed from any suitable X-ray source 3 toward the rear wall 4 of crystal 5. This crystal is preferably a highly perfect single crystal block into which two wide grooves have been cut so as to define three parallel and upstanding walls 4, 6, and 7, which may be considered as three separate parallel crystals with the center crystal 6 equally spaced from the two outer crystals 4 and 7. The walls 4, 6, and 7 may be regarded, respectively, as a beam splitter 5, two transmission mirrows M, and an analyser crystal A. The single crystal 5 has been successfully made of silicon. The original spatial lattice configuration, present in crystal 5 before cutting the grooves, is present in walls 4, 6 and 7 due to their being integrally connected by the base 8 of the original crystal.

Figure 2:
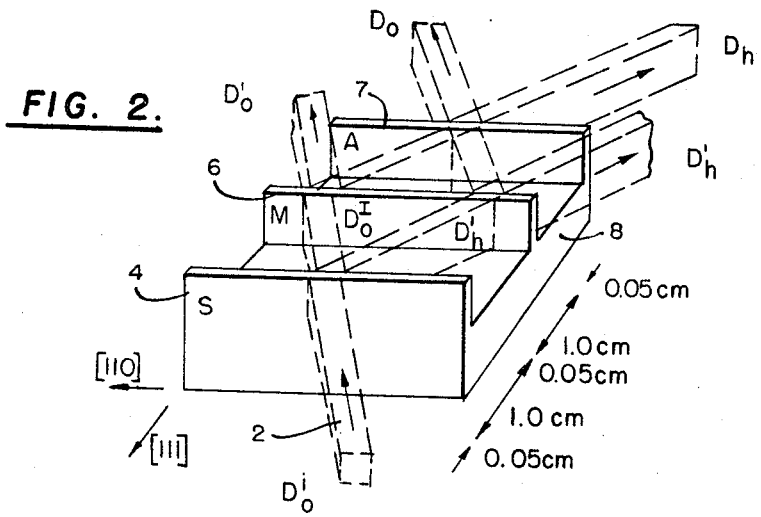
FIGURE 2 is a perspective view of the integral grooved crystal employed in the practice of the invention, showing the paths of the X-rays.

In order to more clearly shown the relationship of the ensuing split beams, the original X-ray beam 2 will be designated $D_o^i$. By means of a symmetrical Laue reflection in the beam splitter crystal wall 4, the incident radiation $D_o^i$ is divided into two coherent beams $D_o^I$ and $D_h^{II}$, as shown in FIGURES 1 and 2. These beams become spatially separated before they reach the crystal wall 6, functioning in this case as two mirrors (one for each beam), where they are again reflected in the Laue case. Of the four beams $D_o^I$, $D_h^I$, $D_o^{II}$, and $D_h^I$ which are generated in passing through crystal wall 6, $D_h^I$ and $D_o^{II}$ converge and overlap on the entrance surface of crystal wall 7, since the outer two crystals 4 and 7 are equidistant from the inner crystal 6. Here they, $D_h^I$ and $D_o^{II}$, set up an interference pattern, the form of which depends on the optical path difference between the first path ($D_o^I$, $D_h^I$) and the second path ($D_h^{II}$, $D_o^{II}$). However, the fringes in this pattern have the same spacing as the Bragg planes and are therefore too close together to be directly observable. This difficulty is overcome by the use of the crystal wall 7 as an analyser crystal. The resultant beam $D_h$ which emerges from the other side of crystal 7 is directed toward any suitable detecting device 9, which may suitably be a photographic plate for use as a topograph.

All three crystals 4, 6, and 7 are made sufficiently thick so that only the wavefield with least absorption can penetrate them, in other words, so that they function as Borrmann crystals. Consequently the beams $D_o^I$, $D_h^{II}$ ... etc. can be considered as plane waves belonging to the wavefield whose energy flow is parallel to the reflecting planes of the crystal lattice. Since the standing wave pattern behind crystal 4 is the continuation of the internal pattern of the weakly absorbed wavefield, its maxima must be between the net planes of the crystal 4. For reasons of symmetry, with no object in either path, this pattern is reproduced in the same position relative to the atomic planes on the entrance surface of crystal 7, and must continue into crystal 7, which is just another statement of the fact that the joint incidence of the coherent waves $D_h^I$ and $D_o^{II}$ generates in crystal 7 the wavefield with least absorption, and only that one. The emerging beams $D_o$ and $D_h$ will therefore be strong in this case. However, if an object 11 (FIG. 1) is put into one of the paths, then the pattern before and in crystal 7 may well have its maxima on the net planes, which means that only the strongly absorbed wavefield is excited. In this case $D_o$ and $D_h$ will have minimum intensity.

Refracting objects in paths I or II cause phase shifts which lead to changes in the position of the standing wave pattern before crystal 7. Since the transmission of crystal 7 is sensitive to the position of the standing wave pattern, the phase shifts can be measured very precisely. Within the wavelength range where the Borrmann transmission does not change considerably, the operation of the X-ray interferometer is substantially independent of the X-ray wavelength.

Figure 3:
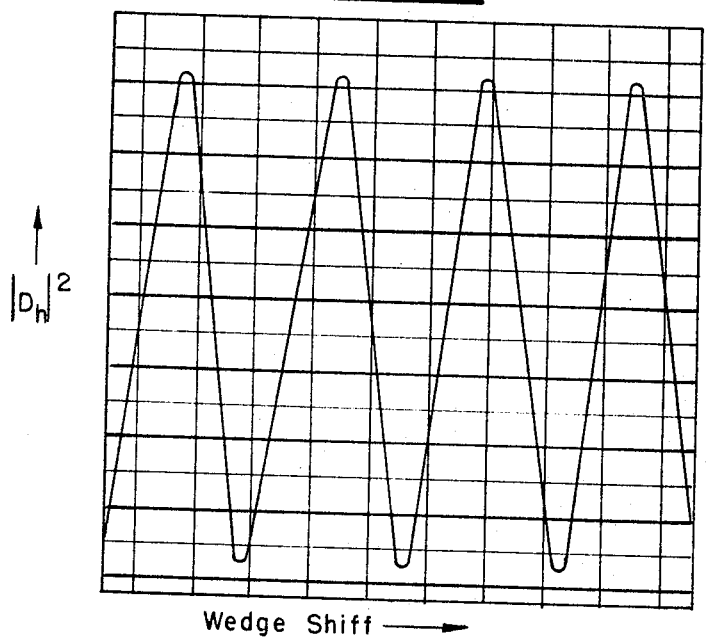
FIGURE 3 is a graph illustrating the invention.
Figure 4A:
FIGURES 4A and 4B represent X-ray topographs obtained by the practice of the invention.

The curve in FIG. 3 shows the well-known cosine squared intensity variation of interference fringes obtained when a Lucite wedge 12 (polymethylmethacrylate) is shifted in the beams as shown in FIG. 1 by arrow 13. This plot was obtained experimentally and shows definitely that interference really occurs. With copper K$\alpha$ radiation ($\lambda$=1.54 A.), 37.6 microns of Lucite produce a phase advance of $2\pi$ radians. From the spacing of the maxima, the electron density of Lucite was deduced and was found to agree with the directly calculated value to better than 1%. Furthermore, good fringe visibility $V=(I_{max}-I_{min})/(I_{max}+I_{min})\approx 91\%$ demonstrates the high degree of coherence existing between the interfering beams. In this demonstration the path difference is constant over the whole width of the beams. By placing a wedge at 11 instead of the sample shown, with its edge horizontal, in only one path, the phase difference varied linearly from the top to the bottom of the field. This is evident from the high contrast fringe pattern in FIG. 4A which is a topograph obtained with the beam $D_h$ under this condition. Lucite wedges with angles of approximately 2° give fringes with spacings of about 1 mm. Fringes with the expected spacings were observed in $D_o$ and $D_h$, but there were no fringes in either $D_o'$ or $D_h'$. Similar fringes in $D_o$ and $D_h$ were also observed when the wedge was put in $D_h^{II}$, $D_h^I$ or $D_o^{II}$. No fringes were observed when either $D_o^I$ or $D_h^{II}$ were removed by an opaque screen. For a uniform object the fringes correspond to lines of equal thickness. Objects with local variations of electron intensity yield a phase contrast topograph of these inhomogeneities.

Figure 4B:

With no object in either path the topograph should be uniform. This is not the case in practice, as shown in FIG. 4B, which is a topograph obtained with no object in the interfering beams. Its non-uniformity or asymmetry is believed to be due to very slight mechanical strains, even in these highly perfect crystals. This pattern can be considered to be basically a moiré arising from the overlap of the three crystals 4, 6, and 7. One fringe spacing corresponds to a "misplacement" between the crystals of about 2 A. This demonstrates the extreme sensitivity of the interferometer to lattice distortions.

Other designs, using Bragg case reflections or both Laue or Bragg case reflections, as well as Bragg case beam splitters and analysers are also possible arrangements. However, the results shown in FIGS. 3 and 4 were obtained using copper Kα radiation and the 220 Laue reflection, representing diffraction by lattice planes which are normal to the crystal surface.

In this description, the term "reflected beam" is used to describe the diffracted beam produced by Laue or Bragg diffraction, as is common in this art.

What is claimed is:
1. An X-ray interferometer comprising:
 (a) a set of three aligned and substantially dislocation-free crystal slabs in a parallel array with one of the slabs between and equidistant from the other two,
 (b) each of said crystal slabs being sufficiently thick to function as a Borrmann crystal at a given range of X-ray wavelengths,
 (c) means for directing an incident beam of X-rays of said given range towards the outer face of one of the outer slabs at an angle such as to produce a split beam of two coherent first diffracted rays diverging from the inner face of said one outer slab toward and falling upon one face of the middle crystal slab,
 (d) said middle crystal slab being parallel to said one outer slab so that each of said two divergent diffracted beams is in turn split in similar fashion to produce four coherent second diffracted beams, two of which converge toward a common focus at the third slab so as to set up an interference pattern in passing through said third slab,
 (e) detecting means in the path of at least a portion of a resultant beam emerging from said third slab for detecting interference effects between said converging beams.
2. The invention according to claim 1 wherein said three crystal slabs are fabricated from a single crystal slab.
3. The invention according to claim 2, wherein said three crystal slabs are integral with a part of the original crystal structure.
4. The invention according to claim 1, the angle of said incident beam with respect to the crystal lattice structure being such as to produce Laue reflections.
5. The invention according to claim 1, said detecting means being means for producing a topograph showing the interference effect.

References Cited
UNITED STATES PATENTS
2,543,630    2/1951    Hansen _____ 250—51.5 X WILLIAM F. LINDQUIST, *Primary Examiner.*

U.S. Cl. X.R.

250—65